United States Patent
Miller et al.

(10) Patent No.: US 11,826,953 B2
(45) Date of Patent: Nov. 28, 2023

(54) SURROGATE SUPPORTS IN ADDITIVE MANUFACTURING

(71) Applicant: DIVERGENT TECHNOLOGIES, INC., Los Angeles, CA (US)

(72) Inventors: Samuel Noah Miller, Los Angeles, CA (US); Michael Thomas Kenworthy, Los Angeles, CA (US); Eric Paul Monteith, Los Angeles, CA (US); Thomas Samuel Bowden, Jr., Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 675 days.

(21) Appl. No.: 16/568,188

(22) Filed: Sep. 11, 2019

(65) Prior Publication Data

US 2020/0079028 A1 Mar. 12, 2020

Related U.S. Application Data

(60) Provisional application No. 62/730,505, filed on Sep. 12, 2018.

(51) Int. Cl.
*B22F 10/47* (2021.01)
*B33Y 10/00* (2015.01)
(Continued)

(52) U.S. Cl.
CPC ............ *B29C 64/153* (2017.08); *B22F 10/28* (2021.01); *B22F 10/47* (2021.01); *B29C 64/205* (2017.08);
(Continued)

(58) Field of Classification Search
CPC ..... B29C 64/40; B29C 64/153; B29C 64/205; B29C 64/245; B29C 64/255;
(Continued)

(56) References Cited

U.S. PATENT DOCUMENTS

| | | |
|---|---|---|
| 5,203,226 A | 4/1993 | Hongou et al. |
| 5,742,385 A | 4/1998 | Champa |
| (Continued) | | |

FOREIGN PATENT DOCUMENTS

| | | |
|---|---|---|
| CN | 107303728 A | 10/2017 |
| DE | 102013218760 A1 | 3/2015 |
| (Continued) | | |

OTHER PUBLICATIONS

US 9,202,136 B2, 12/2015, Schmidt et al. (withdrawn)
(Continued)

*Primary Examiner* — Lawrence Averick
(74) *Attorney, Agent, or Firm* — ARENTFOX SCHIFF LLP

(57) ABSTRACT

3-D build jobs having surrogate supports, 3-D printers using surrogate supports, and techniques to support vulnerable regions of build pieces using surrogate supports are disclosed. The surrogate supports are generated in a first material configuration and are offset via a gap from the vulnerable regions. The gap comprises a second material configuration, such as loose or partially fused powder on which the build piece can be supported during 3-D printing. In alternative embodiments, the gap instead includes thin manual ties or a solid body using material that is stronger but more amenable to breaking off without damaging the build piece. Post-processing steps are dramatically reduced as the surrogate supports and gaps facilitate virtually error-free separation from the build piece. In an embodiment, the surrogate supports include a support structure extending to a fixed base underneath, the fixed base being a build plate or a global surrogate.

7 Claims, 7 Drawing Sheets

(51) Int. Cl.
  *B33Y 30/00* (2015.01)
  *B29C 64/153* (2017.01)
  *B29C 64/40* (2017.01)
  *B29C 64/205* (2017.01)
  *B29C 64/268* (2017.01)
  *B29C 64/255* (2017.01)
  *B29C 64/329* (2017.01)
  *B29C 64/245* (2017.01)
  *B22F 10/28* (2021.01)
  *B33Y 40/00* (2020.01)
  *B22F 12/52* (2021.01)
  *B22F 12/67* (2021.01)
  *B22F 10/66* (2021.01)

(52) U.S. Cl.
  CPC .......... *B29C 64/245* (2017.08); *B29C 64/255* (2017.08); *B29C 64/268* (2017.08); *B29C 64/329* (2017.08); *B29C 64/40* (2017.08); *B22F 10/66* (2021.01); *B22F 12/52* (2021.01); *B22F 12/67* (2021.01); *B33Y 10/00* (2014.12); *B33Y 30/00* (2014.12); *B33Y 40/00* (2014.12)

(58) Field of Classification Search
  CPC ..... B29C 64/268; B29C 64/329; B22F 10/47; B22F 2999/00; B22F 10/28; B22F 10/00; B22F 10/10; B33Y 10/00; B33Y 30/00; B33Y 40/00; B33Y 40/20; B33Y 80/00; Y02P 10/25
  See application file for complete search history.

(56) References Cited

U.S. PATENT DOCUMENTS

| | | | |
|---|---|---|---|
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,183,325 | B2 | 11/2015 | Wighton et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,512,544 | B2 * | 12/2016 | Heikkila .................. B22F 5/12 |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 * | 2/2017 | Buller .................... B22F 3/003 |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |

(56) References Cited

U.S. PATENT DOCUMENTS

| | | |
|---|---|---|
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,767,224 B2 | 9/2017 | Chou et al. |
| 9,770,760 B2 | 9/2017 | Liu |
| 9,773,393 B2 | 9/2017 | Velez |
| 9,776,234 B2 | 10/2017 | Schaalliausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 * | 3/2018 | Buller .................. B23K 26/034 |
| 9,931,697 B2 * | 4/2018 | Levin .................. B23K 15/0013 |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 * | 5/2018 | Buller .................... B22F 10/20 |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,691 B2 * | 8/2018 | Heikkila .................. B22F 3/225 |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,153,877 B2 * | 12/2018 | Park ....................... H04L 5/0048 |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 * | 2/2019 | Buller .................. B29C 64/165 |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |

(56) References Cited

U.S. PATENT DOCUMENTS

| | | |
|---|---|---|
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 11,090,724 B2 * | 8/2021 | Ng ........................ B29C 64/209 |
| 2006/0108783 A1 | 5/2006 | Ni et al. |
| 2009/0039570 A1 | 2/2009 | Clark |
| 2014/0277669 A1 | 9/2014 | Nardi et al. |
| 2014/0291886 A1 | 10/2014 | Mark et al. |
| 2015/0080495 A1 * | 3/2015 | Heikkila ................... C08K 3/40 264/642 |
| 2016/0144428 A1 | 5/2016 | Mironets et al. |
| 2016/0175932 A1 | 6/2016 | Dimter et al. |
| 2016/0221264 A1 | 8/2016 | Doherty et al. |
| 2016/0256925 A1 * | 9/2016 | Heikkila ................. B22F 1/0655 |
| 2016/0297007 A1 * | 10/2016 | Buller ....................... H05B 6/68 |
| 2017/0111148 A1 * | 4/2017 | Park ......................... H04L 5/0048 |
| 2017/0113344 A1 | 4/2017 | Schönberg |
| 2017/0136539 A1 * | 5/2017 | Chou ....................... G06F 30/00 |
| 2017/0144254 A1 * | 5/2017 | Buller ..................... B29C 64/165 |
| 2017/0165792 A1 * | 6/2017 | Buller ...................... B23K 26/04 |
| 2017/0232672 A1 | 8/2017 | Fieldman et al. |
| 2017/0239720 A1 * | 8/2017 | Levin ..................... B23K 26/702 |
| 2017/0239721 A1 * | 8/2017 | Buller ..................... B23K 26/04 |
| 2017/0297097 A1 | 10/2017 | Gibson et al. |
| 2017/0297103 A1 | 10/2017 | Myerberg et al. |
| 2017/0304944 A1 * | 10/2017 | Symeonidis ............. B33Y 10/00 |
| 2017/0341309 A1 | 11/2017 | Piepenbrock et al. |
| 2017/0343984 A1 | 11/2017 | Czinger et al. |
| 2017/0365484 A1 | 12/2017 | Kotler et al. |
| 2018/0169757 A1 | 6/2018 | Murao |
| 2018/0221958 A1 * | 8/2018 | Torun ......................... B22F 3/24 |
| 2019/0202127 A1 * | 7/2019 | Ng ........................... C04B 35/584 |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2012/131481 A1 | 10/2012 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion received in PCT/US2019/050803 dated Dec. 4, 2019.

(56) References Cited

OTHER PUBLICATIONS

Supplementary European Search Report received in European Patent Application No. 19860908.3, dated Apr. 25, 2022.
First Office Action in CN 201910866425.3, dated Sep. 2, 2022, 10 pages.
English language translation of the Notification of the First Office Action issued in CN 201910866425.3, dated Sep. 2, 2022, 10 pages.

* cited by examiner

SURROGATE SUPPORTS IN ADDITIVE MANUFACTURING

CROSS-REFERENCE TO RELATED APPLICATIONS

This application claims the benefit of U.S. Provisional Application No. 62/730,505, which was filed on Sep. 12, 2018, the contents of which are incorporated herein by reference in its entirety as if fully set forth herein.

BACKGROUND

Field

The present disclosure relates generally to additive manufacturing (AM), and more particularly, to techniques for preventing deformation and sag in build pieces.

Background

AM parts, or "build pieces" constructed via a three-dimensional (3-D) printer are conventionally printed on a horizontally-disposed substrate. For instance, powder bed fusion (PBF) AM systems create build pieces layer-by-layer within a powder bed having a build plate at its base. PBF systems sequentially deposit layers of powder and selectively expose portions of the powder in each deposited layer to an energy beam. The exposed portion of the powder layer solidifies into a layer of the build piece. The cyclic depositing and melting of layers continues until the part is complete.

The non-design specific nature of AM advantageously allows build pieces to be geometrically diverse, meaning they can be printed using curved, inclined, or overhanging shapes. Prior to solidifying, however, these shapes can sag or deform due to the influences of gravity and thermal effects. To counter these negative effects, manufacturers conventionally insert support structures ("supports") underneath the affected regions during AM. These supports allow 3-D printing of build pieces by connecting overhanging or curved structures via the supports to the build plate during solidification, thereby preventing unwanted part deflection and deformation.

Use of conventional support structures in AM approaches has had drawbacks. After supports are used to connect overhanging features, removal of the supports at completion of the print is necessary. Support removal can be a laborious and time-consuming process. Removal also requires cuts at the boundary of the build piece that can be imprecise. The cuts may result in an inferior surface finish in regions of the build piece that were connected to the supports. Further, in their role as supports for the structure of the parts, the supports themselves often become load-bearing. Residual stresses on these load-bearing supports can cause deflection on affected regions of the build piece when the supports are removed, further reducing quality.

SUMMARY

Several aspects of apparatuses and methods for improving the quality of geometrically diverse 3-D build pieces will be described more fully hereinafter.

In one aspect of the disclosure, a build job includes one or more vulnerable regions requiring support during a 3-D print, and at least one surrogate support in a first material configuration and offset from the vulnerable regions by a gap, wherein the gap comprises a second material configuration.

In another aspect of the disclosure, a three-dimensional (3-D) print apparatus includes a leveler for depositing layers in a powder bed, an energy beam source arranged above the powder bed for selectively fusing powder in each deposited layer to form a build piece, and a controller configured to cause the energy beam source to generate at least one surrogate support in a first material configuration offset from vulnerable regions in the build piece by a gap, wherein the gap comprises a second material configuration.

In still another aspect of the disclosure, a method for additive manufacturing includes receiving instructions identifying a build piece to be printed, the build piece comprising at least one vulnerable region requiring support during 3-D printing, and 3-D printing the build piece to include a surrogate support in at least one material configuration underneath the at least one vulnerable region, wherein the surrogate support is offset by a gap from the at least one vulnerable region, and wherein the gap comprises a second material configuration.

Other aspects will become readily apparent to those skilled in the art from the following detailed description, wherein is shown and described only several exemplary embodiments by way of illustration. As will be realized by those skilled in the art, concepts described herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects will now be presented in the detailed description by way of example, and not by way of limitation, in the accompanying drawings, wherein.

DETAILED DESCRIPTION

Figure 1A:
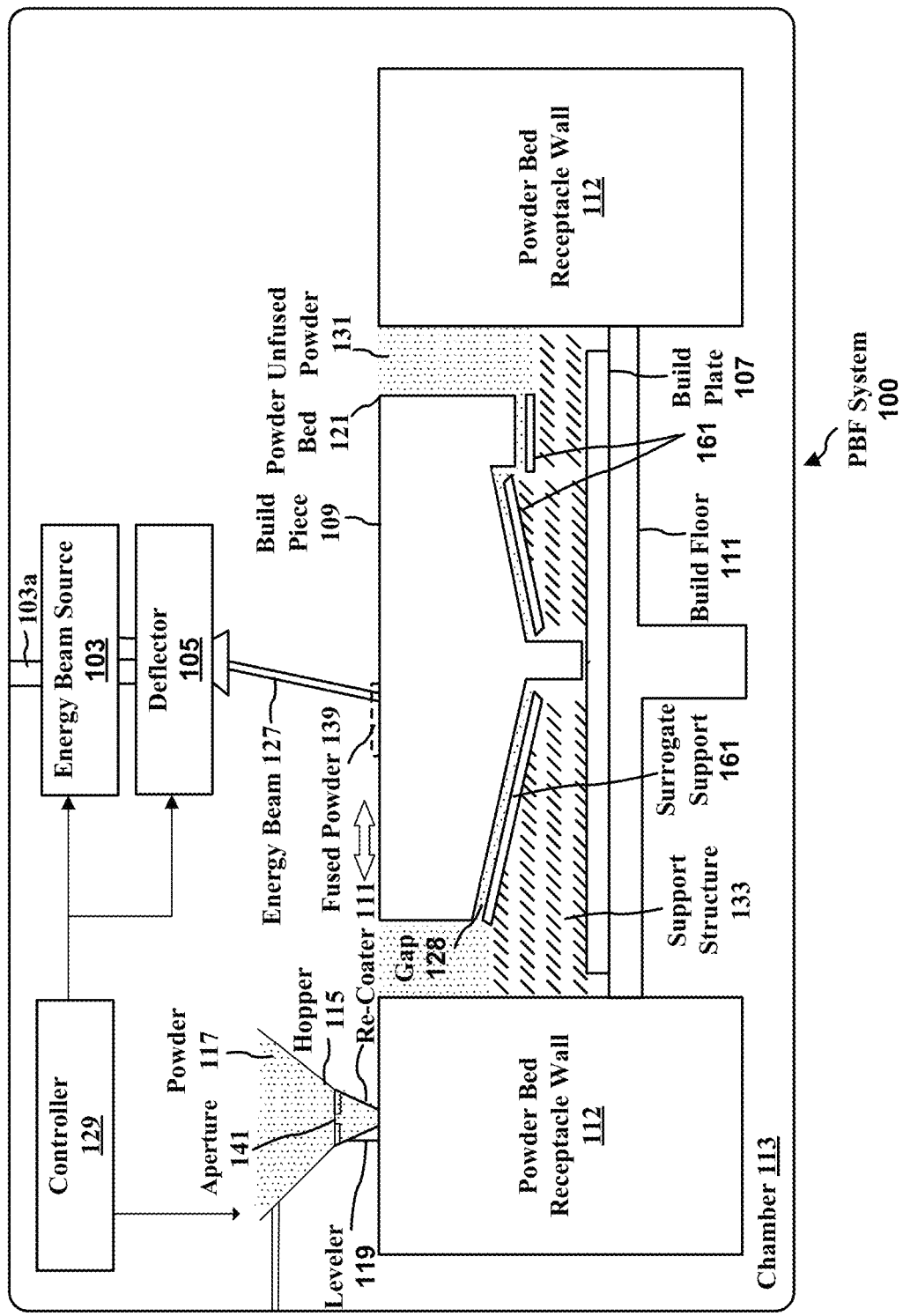
FIG. 1A is a cross-sectional diagram of an exemplary PBF 3-D printer using surrogate supports with reference to an embodiment.

The present disclosure addresses a common set of problems that manufacturers currently face when using support structures to support vulnerable regions of build pieces in 3-D printing hardware. For purposes of this disclosure, vulnerable regions constitute structural features of a 3-D printed build piece including but not limited to concave and convex curves, inclines having a threshold angle, overhangs, and other structural shapes for which support is required during a 3-D print to prevent sag, deformation, and deflection.

The support requirements may sometimes differ based on a category of relevant printing technologies (e.g., PBF) and structure types that are often artifacts of different commercial markets. In markets such as aerospace, automotive, transport structures in general and other mechanized assemblies where the need for high quality AM solutions is on the rise, there lies a continuous need to improve productivity, throughput and quality of build pieces generated from 3-D printers in use today. Additionally, as 3-D printing technologies expand along with technologies in general, the 3-D printed parts are becoming more complex, thereby introducing more or new vulnerable regions on average per part. These consequences in turn require more sophisticated, or at least more clever, support solutions.

High grade components generated using many if not most types of 3-D print technologies often have structural vulnerabilities that require compensation using physical support during the print stage. For example, associated with most PBF printers is a maximum angle of inclination (e.g., 45 degrees, although the actual numbers can vary widely depending on the model) for structures that can be incorporated into a build piece design before the build piece becomes susceptible to sagging or deflection and consequently requires supports. Curvatures and other geometries may have their own set of criteria for identifying threshold requirements for some type of support.

As a result, structural supports become necessary to physically connect the inclined, curved, overhanging or other vulnerable portion to a stable surface, such as a build plate. These supports are generally not part of the printed components, but are nevertheless needed to support regions of the component during the print. Still other facets of components in use today rely on other support structures to effectively construct a build piece free of sags, deformations, and deflections—the latter caused in part by thermal gradients as the energy beam source fuses and temporarily liquefies sintered materials on the build piece into weld pools just prior to solidification. These vulnerable regions also rely on support structures to affix adjacent regions of the part to stable surfaces for accurate printing.

AM involves the use of a stored 3-D geometrical model for accumulating layered materials on a build plate to produce a three-dimensional (3-D) build piece having features defined by the model. AM techniques are capable of printing complex components using a wide variety of materials. A 3-D object may be fabricated based on a computer aided design (CAD) model. The CAD model can be used to generate a set of instructions or commands that are compatible with a particular 3-D printer. The AM process can create a solid 3-D object using the CAD model and print instructions.

The print cycle conventionally begins with a designer that renders a three-dimensional computer-aided design (CAD) file of the build piece. For the initial CAD phase, manufacturers ordinarily acquire one of several commercially-available or proprietary CAD software applications or application suites. This phase often involves a rigorous 3-D software design of the component that may be specialized for subsequent use in a vehicle or otherwise as a stand-alone component after being 3-D printed. Initially, during CAD, the component is created as a 3-D software design representation such that all features of the model are available to the viewer in three dimensions.

The CAD stage is conventionally followed by a computer-aided manufacturing (CAM) stage. This stage often includes support generation. The support structures deemed needed for portions of the build piece identified to harbor certain vulnerabilities as discussed above may be generated at this stage. In some configurations, CAD and CAM files may be integrated to enable automated support insertion to occur in conjunction with the print during or near real time (or with some 3-D print technologies, manually at the necessary time in the right places). In other embodiments, the supports are 3-D printed just like the build piece, but get separated from the build piece using a cutting tool during post-processing steps. Ordinarily, the supports are permanently connected (e.g., fused) to the vulnerable regions of the build piece. In addition to providing a thermal conduction path, the fusing prevents, curves, inclines and similar geometries from moving (e.g., sliding or sagging) relative to the support.

Following the CAM stage, another suite of algorithms is typically recruited to "slice" the 3-D CAD representation of the build piece into a large collection of individual layers. Layers may number in the thousands in some circumstances. In most cases, the layers each represent a very small portion of the overall 3-D representation of the build piece. Where PBF and similar technologies are to be used, each of the slices may generally correspond to an analogous layer of powder that is initially deposited as a generally flat region on a build plate or substrate of the printer. Each ensuing layer or slice is sequentially deposited over the preceding layer. Between the depositing cycle of each such layer, there may be a print cycle where selective portions of the layer corresponding to the original CAD program at the vertical location represented by the layer (or, more simply, corresponding to the powder slice at issue) are sintered or melted by an energy beam source to become a solidified part of the build piece. This process is explained further below.

Thus, it is conventionally during one of the many periods following a "slice" stage that the solid state processing system or controller of the PBF system can 3-D print one or more supports on the powder bed of the printer in anticipation of an upcoming vulnerable region. As a simple example, where a CAD model has been designed such that there is a physical overhang somewhere in the middle of the CAD representation, then during the print cycle, before the layer is first reached that corresponds to the lowest portion of the overhang, support material may be 3-D printed (or inserted) prior to deposition of that lowest layer of powder to ensure the overhang, when melted by the energy beam during the print cycle, stays in position relative to the remainder of the build piece.

Referring briefly back to the 3-D printers that commonly encounter these issues, PBF and similar systems ordinarily rely on a processing system or controller that executes the appropriate print instructions to deposit the slices as described above. The controller can use an energy source to selectively solidify the powder in a layer-by-layer fashion in the printer as prescribed by the CAD model. As noted above in the case of PBF, each layer is formed by depositing a layer of powder and exposing, per controller instructions, designated portions of the powder to an energy beam such as a laser, electron beam, etc. The energy beam is applied via a deflector to melt areas of the powder layer that coincide with the cross-section of the build piece in the layer. The melted powder cools and fuses to form a slice of the build piece. The process can be repeated to form the next slice of the build piece, and the next, and so on until the build piece is complete. Each powder layer is deposited on top of the previous layer. The resulting structure is a build piece assembled slice-by-slice from the ground up. The present disclosure may use PBF-based 3-D printing in an exemplary implementation, but the present disclosure is not limited to this application, and in fact can extend to any 3-D printer system which requires supports to ameliorate the problems in the art discussed above.

Referring back to the above example of the PBF 3-D printer, there may exist long sequences of powder deposition cycles, where a re-coater may acquire powder from a hopper or other storage mechanism and mobilize to deposit individual layers of powder in a powder bed, as more clearly illustrated with reference to FIG. 1A, below. Many different re-coaters and levelers exist. In general, the re-coater may include apertures or small slits for controllably dispensing powder layers onto the powder bed, and a leveler, or one or more specialized blades or a roller for smoothing and straightening the deposited powder layer. In some embodiments, the re-coater can deposit a layer in both directions (i.e., left-to-right and right-to-left). When its powder supply is running low, the re-coater may "re-park" itself underneath the hopper to acquire more powder. In other embodiments, the 3-D printer may instead use a powder reservoir to the left of the powder bed. To effect the deposition cycle, a leveler or roller pushes and smooths out layers of powder from the reservoir on the left and onto the powder bed. The reservoir may include a piston at the bottom that slowly but progressively moves up more powder in sync with the pace of the deposition cycles. The piston moves in a start-stop motion until the powder begins to protrude from the reservoir. The protruding powder makes it easy for the leveler or re-coater to push the next deposition layer onto the powder bed on the right and smoothen it into the next layer.

Whatever the embodiment used, each deposition cycle providing a new layer of unfused powder may thereupon be followed by a print cycle, wherein a laser, electron beam or other energy source relies on a deflector, which can be likened to a mirror or metal-based reflector of light and/or particle-based energy, to mobilize the beam to selected areas around the surface of the layer and, per controller instruction, selectively melts the deposited powder in the layer. The melted layers begin as a weld pool and rapidly solidify to form a hardened part of the build piece. Deposition and print cycles typically occur in an alternating sequence. This process may be interrupted when a support is required to be inserted, unless the support is also being 3-D printed, as is often the case, and fused into a posterior vulnerable region of the build piece until post-processing steps are employed to sever the connection.

Accordingly, where the melted layers are prone to sagging or deflection, the manufacturer takes this into account by incorporating support structures into and underneath the vulnerable portions of the build piece. These "vulnerable" portions are any portion, part, structure, feature, or piece of the build piece that requires support during at least a part of the printing process. Vulnerable portions may vary based on the print model and materials used in the print. Vulnerable materials often include curvatures with a threshold measure of convexity or concavity, inclines above a designated angle, overhangs, and other areas that would be prone to sag, deflect, deform, or lose shape during any part of the print process. This process of inserting supports may involve the 3-D printer rendering the support areas based on identified support points, so that the support areas are part of the build piece but need to be removed in post-processing steps. The integration of supports may in some implementations be driven automatically by programmed software, in which the printer or an automated constructor such as a robot, or dedicated hardware element in the printer itself, inserts the supports and may bond them using the thermal bonding inherent in the PBF process, or in other technologies via an adhesive mix, underneath the applicable portions of the layers that require them. In some cases, the support process can be facilitated manually at least in part. An automated sequence of support insertion events using supports generated during the CAM process may be ideal to maximize precise placement of the supports.

Thermal stress may also be a cause for supports. Large or unevenly distributed heat loads may be routinely applied during the print cycles. These stresses can cause warping on the part or can produce cracks. Supports can be used to anchor vulnerable features to the build plate. These solutions can therefore act as both a structural support and a heat sink. Generally, the requirement of supports costs extra money to build individual parts, since more material is being used per build piece.

After the print, various post-processing steps are generally required as touched upon in preceding paragraphs. Each of the post-processing steps may contribute to a slower overall pace when producing one or more build pieces in a powder bed of a printer. Post-processing involving print removal is typically a significant, time consuming step. In particular, each build piece may go through further processes of powder removal as well as support removal from the build piece and the build plate. Both of these procedures are conventionally necessary to liberate the build piece from its underlying AM process.

Referring specifically to the support removal step, the support structures must be separated from the build piece. Removal of fused supports is a delicate process, and is almost akin to a surgical procedure for particularly small or vulnerable regions of the build piece from the adjacent supporting material. In addition to the risks identified above, this process can be time consuming, and necessitates delicate handling of the printed component to avoid cracking of the build piece or imprecise separation of the support material.

As noted above, the increasingly complex parts and progressively larger print beds in modern AM systems often means that more supports are used per print job. This phenomenon may not only compromise the part integrity, but also may serve to increase the time for a technician or autonomous device to physically remove the supports without destroying the build piece. Where a larger number of smaller supports are used to support different types of vulnerabilities on a given build piece, a removal priority strategy may first have to be developed to minimize the potential for harm to the build piece. In short, the removal of supports can be a time-consuming part of the overall post-processing step. The time is only made longer as more and more build pieces are produced, possibly from a plurality of 3-D printers.

A separate but related challenge involves the continued need to adequately accommodate the increasingly complex nature of build piece geometries available in modern manufacturing processes. In some cases, there may be a large number of supports connecting the build piece to the platform, build plate, substrate, etc. The number of supports may be commensurate with the complexity of the part. The requirements to manufacture and position these supports are time consuming.

Similarly, as 3-D printing is used more frequently in assembling intricate vehicle and aircraft parts, the AM parts themselves often become progressively more complex. Consequently, in some cases alluded to above, a single part may use a large number of smaller supports to accommodate its various vulnerabilities. Where the build pieces are sufficiently small, it is often beneficial to render a plurality of such pieces contemporaneously in one printer. The need for further supports has, nevertheless, exacerbated the problems that the present disclosure proposes to address.

For example, smaller supports require greater precision to productively handle. In addition, where a plurality of supports are coupled integrally with a single component, it becomes that that more difficult to effect removal of the supports without risking tiny stress fractures and other internal flaws that may go unseen, but that may manifest themselves later, e.g., when the build piece was intended for a vehicle and is already assembled therein. The delicacy of any given component naturally adds to this risk.

These complex build piece geometries include continually more detailed and physically smaller features. The more intricate and functionally significant these features become, the less desirable it is to place supports on the corresponding surfaces of the build piece, only to have to remove them in post-processing steps. In particular, the use of supports will likely add surface roughness to the build piece when the supports are cut off. The benefits achieved by the increased complexity of the part may even be offset by risks of damage and the potentially rough nature of the post-processing cuts. The supports may also contribute to potential distortion of the features (e.g., the features may move), even when the opposite result is intended. These adverse effects increase in magnitude as the geometrical features get smaller in size and more sophisticated. For these and other reasons, the use of conventional supports represents an impediment to growth in the 3-D printing arena.

Accordingly, in one aspect of the disclosure, surrogate supports are implemented in an AM system. Surrogate supports (also called "surrogates") are sacrificial parts that occupy the negative space of a given feature of a build piece being printed. Surrogate supports, and their role as a beneficial advance in AM, are introduced initially with reference to FIG. 1A.

FIG. 1A is a cross-sectional diagram of an exemplary powder based fusion (PBF) 3-D printing system 100 using surrogate supports with reference to an embodiment. PBF system 100 includes controller 129, which may include one or more processors such as microprocessors, digital signal processors (DSP), and various other analog and digital circuits configured to receive signals and transmit instructions to the different regions of the 3-D printer and the actuators and control inputs included in a given region. Controller 129 may be partially or fully integrated within system 100, or it may be part of a dedicated or generic computing device coupled to system 100, depending on the print model and/or the manufacturer's configuration. Controller 129 may also include different kinds of memory (volatile, non-volatile, read only memory, random access only (RAM), programmable read only memory, erasable-programmable read only memory, static RAM, dynamic RAM, etc.) to store data files, programs, dynamic link libraries, configuration parameters, and the like.

In one aspect of the disclosure, the controller 129 may also store instructions to generate not only the build piece, but also the supports and constituent material configurations for the build piece 109 that are described in greater detail below. For example, the controller may include this information and these instructions in preexisting algorithms that can be selectively accessed as necessary to generate the appropriate support structures. Alternatively, or in addition, the support structures and related configurations may have been developed and matured by a designer in connection with the CAD program. After this point, instructions and algorithms for rendering the support structures as described in detail herein may be stored in the memory and subsequently executed by the controller 129 to render the build piece with a base of support as part of the overall build job. Thus, the build job may include not only the build piece 109, but also part or all of the different types of surrogate structures (see below) and other material configurations that collectively effect at least some, if not all, principles of the disclosure.

System 100 further includes one or more energy beam sources 103 for generating one or more respective energy beams 127 (such as, for example a laser or electron beam source in the case of PBF printer). System 100 may further include one or more deflectors 105. The illustrated deflector 105 receives a beam from source 103 and alters the beam's reflection angle responsive to controller 129 to selectively direct the energy beam 127 to fuse powder 139 in powder bed 121 during a print cycle. In the example shown, the deflector 105 is channeling the energy beam source 103 to fuse the build piece at the top layer of powder region 139, which becomes fused powder and part of a build piece 109. Printer 100 may be housed in a closed chamber 113 such that one or more energy beam sources 103 are arranged sequentially or otherwise in a pattern on an upper wall of the chamber 113 (only one such connection 103a is shown for simplicity). The chamber 113 may also include powder bed receptacle walls 112 which define the powder bed 121. The build plate 107 may be supported by a build floor 111, the latter of which may be configured to move vertically downward responsive to controller 129 instructions as the build piece increases in size and the 3-D print progresses. Thus, as layers are progressively deposited, a top surface of the build piece 109 and adjacent unfused powder 131 deposited in the powder bed 121 will remain at a substantially even distance (or within a reasonable margin) from the energy source 103. The powder bed 121, and a build plate 107 which may form the base of the build piece 109, may act as the substrate for the 3-D build. Printer 100 may further include a hopper 115 for storing powder 117. In this exemplary PBF system 100, the hopper 115 is a larger bin configured to be fixed to a side of chamber 113 above a powder bed receptacle wall 112. The hopper's function is to store the majority of powder to be used in a single rendering of a build piece or group thereof.

Directly underneath hopper 115 is a re-coater 111. In certain vernacular, the re-coater 111 may also be referenced as a depositor. For purposes of this disclosure, the re-coater 111 obtains powder from the hopper 115 via an aperture 141 (shown currently as closed to indicate that the re-coater 111 is full) disposed in the middle of the triangular-shaped elements. The re-coater may, in an embodiment, extend into the illustration such that it has a width (not apparent from the cross-sectional view) sufficient to deposit layers of the powder 117 across the entire width of the powder bed 121 (i.e., the dimension running into and out of the drawing).

In this embodiment, the re-coater 111 is a dynamic structure that is configured to move along with the leveler 119 from one end of the powder bed 121 to the other for purposes of depositing a layer of powder during a re-coat cycle (in preparation for the next print cycle). The direction of motion of the re-coater 111 is shown by the bi-directional arrow immediately to the right of the 111 reference number. The leveler or leveling member 119 in this embodiment is a structural part of the re-coater 111. The leveler 119 may be used to straighten and level each deposited powder layer. In particular, after a print cycle, the re-coater 111 may be re-positioned on the left side of the PBF system 100, e.g., above the left powder bed receptacle wall 112 and again beneath the hopper 115. With assistance from the controller 129, the re-coater 111 determines whether it has enough powder to traverse the powder bed 121 and populate it with another layer of powder. If not, the controller can open aperture 141 and cause powder from the hopper 117 to enter the re-coater 111 until a sufficient amount is filled. Otherwise, during the next re-coat cycle, the re-coater 111 may separate from the hopper 115 to deposit another layer on the powder bed. The re-coater 111 usually includes one or more slits (obscured from view) that pour out the raw powder in generally even amounts as the re-coater 111 is propelled across the surface of the powder bed 121. In alternative embodiments, the depositing slits are adjacent the leveler 119, which may be a structure permanently attached to the hopper 115. In another embodiment, the hopper 115 is part and parcel of the re-coater 111 and moves along with the re-coater 111 during deposition cycles. The leveler 119 may also extend across a width of the powder bed 121 and may serve to even or smooth out the new layer of unfused powder that is being ejected by the re-coater 111. In some embodiments, the leveler 119 may include more than one blade. For example, in some configurations the leveler 119 is capable of traversing left-to-right to deposit one layer, and thereafter right to left to deposit another layer after the first layer is selectively fused.

In still other embodiments, the leveler 119 or the re-coater 111 may take the form of a cylindrical shaped roller that is configured to smooth out the deposited powder by gently rolling it straight. In these cases, the roller may smooth out a powder ejected from a re-coater 119, or the re-coater 111 may not be needed and the roller may store and eject the unfused powder. In other 3-D printers not specific to PBF, still other embodiments may be adopted using different powder ejection mechanisms that remain within the scope of the disclosure.

Referring back to controller 129, the controller 129 may be responsible for directing the re-coater 111 to deposit layers of powder 117. After a layer is deposited, the controller 129 may use the print instructions to selectively fuse the necessary regions of the recently-deposited powder layer into solid form. The selectively fused regions correspond to the build piece 109, which may be based on a data model from a computer aided design or modeling (CAD/CAM) application suite, one or both of which may be supplied to a slicer algorithm that is ultimately used to compile the necessary print instructions used by controller 129. During a print cycle, the controller 129 may specifically direct the deflector 105 to fuse identified areas, where the powder melts and solidifies. Portions of the layer that are not fused, such as the unfused powder 131, remain in powder form and do not become part of the build piece 109.

Operation of a specific PBF printer with a number of specific features is being demonstrated. In point of fact, an appreciable number of PBF printers and non-PBF printers are either commercially available or in development. It should be understood that the features discussed above are for purposes of context and illustration, and are not necessary to effect the purposes of the disclosure as described further below. Accordingly, it will be appreciated by those skilled in the art upon review of this disclosure that the supports described below may have wide application to a number of different systems, without departing from the spirit and scope of the present disclosure.

The PBF system 100 of FIG. 1A and the present disclosure has also recognized the need under different sets of circumstances for supports to preserve the integrity of the build piece 109 while contemporaneously avoiding, or substantially mitigating, the problems widely apparent in the art based on the use of such supports.

Accordingly in an aspect of the disclosure, surrogate supports 161 and support structure 133 are introduced in areas where specifications indicate that support is needed, such as in the case of certain incline thresholds and overhangs. Unlike conventional supports as described above, surrogate supports are designed to be partially or completely contact-free from the build piece, such that the surrogate support is offset from the vulnerable region by a gap, such as a gap 128 between the surrogate support 161 and the build piece 109 as described below. In an embodiment, the gap is populated with unfused powder that is obtained, for example, from the hopper 115 via the leveler 117 during the deposition cycle, although in other embodiments the gap may include other elements. In various embodiments, the gap may include partially or fully sintered powder at localized offsets to provide support and a conductive path for thermal management during printing. The gap may be configured to include partially sintered powder, or fully sintered thin segments or other contacts present in the gaps. These embodiments are discussed in greater detail below with reference to FIG. 4.

Thus, in an embodiment, the build piece is supported by the loose powder or alternative material present in gap 128, by surrogate supports 161 and support structure 133, if necessary to more securely fix the surrogate supports 161.

Surrogate supports 161, gap 128, and support structure 133 may provide a collective base of support for the vulnerable regions of the build piece 109. Surrogate supports 161 may be composed of different material configurations. For example, surrogate supports 161 and support structure 133 may be co-printed using fused powder. In an embodiment, support structure 133 may be co-printed or otherwise provided in a material configuration that comprises a lattice structure to support and stabilize surrogate supports 161.

Support structure 133 is described above in FIG. 1A as having a lattice-based material configuration. In other embodiments and depending on the objective, support structure 133 may alternatively be designed to include, in part or in whole, partially sintered material, loose powder with manual ties or other structures, or other material configurations (e.g., honeycomb-based structures, solid fused powder, etc.). In an embodiment where lattice or honeycomb material configurations are used to form part or all of support structure 133, the lattices can be 3-D printed during the formation of the build piece 109. The lattices or honeycomb configurations can, in turn, be coupled to the surrogate supports 161 to provide a base of support from below. These lattice or honeycomb configurations may be composed of a very thin profile as desired, e.g., just strong enough to sustain the necessary support for the build piece 109 via surrogate support 161 and the gap 128 of loose powder. In other cases, the lattice support structures 133 may be stronger for greater support, yet may require less mass. In any case, post-processing separation of the build piece 109 does not involve any separation force other than removing the build piece 109 from the unfused powder in gap 128. These details are discussed further below with reference to FIGS. 3 and 4. Accordingly, no separation forces to produce cracks or stresses are present in this embodiment. In addition, the inclined and overhanging areas of build piece 109 are also supported indirectly (in addition to the powder in the gaps 128) by the rigid material configurations of surrogate supports structures 161. This support in turn prevents inclined, curved and overhanging areas from deforming. Further, because the gap 128 does not generally include a rigid support attached to the build piece 109, there are no deflection forces that might otherwise cause cracks.

In total, three surrogate supports 161 are shown in FIG. 1A—namely, the two surrogate supports 161 that support the respective inclines via gap 128 of loose powder, and the surrogate support 161 that supports the overhang on the right of the drawing. Further, the support structure 133 (which may be lattice or patterned material configurations, among other possibilities) is also coupled to the surrogate supports 161 to provide a broader base of support for the surrogate supports 161. As is evident from the illustration, the surrogate supports 161 may include solid fused sections of metal created during the print cycle, or another rigid material configuration (e.g., partially hollow supports) that is disposed in areas where the build piece 109 would otherwise need support.

As noted, the surrogates support structures 161 can be defined as offset by a gap 128 from an undersurface of the build piece 109. The gap 128 need not be, and typically is not, empty space. Below and supporting the surrogate supports 161 includes a support structure 133, which in the case of FIG. 1A is separated by a middle portion of build piece 109. Support structure 133 extends from surrogate supports 161 to the build plate to create a solid path. In an alternative embodiment noted above, support structure 133 has a fused powder configuration (whether solid or patterned) to reinforce the supports 161. Unlike conventional approaches, the surrogate supports 161 are separated by the gap 128 from the build piece 109.

The gap 128 resides between the surrogate supports 161 and the undersurface of the build piece 109. In this embodiment, the gap 128 includes unfused powder. Thus at the relevant layer and coordinates, the controller 129 does not cause the energy beam 127 to fuse areas corresponding to the gap 128. As a result, in this embodiment, the build piece 109 is entirely separated from the surrogate 161 via the gap 128, the sole exception being the small vertical column in the middle part of build piece 109 that is contacting the build plate 107.

Thus, as shown in FIG. 1A, the build piece 109, surrogate supports 161 and corresponding support structure 133 are initially formed by the printer adding sequential layers of powder in the power bed 121. Following the deposition of each of these sequential layers, one or more energy beams 127 are used to melt or fuse selected regions of the layer representative of either the support structure 133 or of the build piece 109. As noted above, the regions in build piece 109 may be solidified. The material configuration in support structure 133 may also be partially or fully solidified (e.g., it can be selectively fused in the relevant cross-sectional regions of each layer) to provide support, but they are also not part of the build piece 109. The portion of the part or build piece 109 that represents a single vertical column that ultimately contacts the build plate 107 in this example represents a region of the initial layers that was fused by the energy beam source 103 (in some embodiments along with fusing support structure 133), and thus solidified to form the lower part of the build piece 109. Similarly, the remaining portion of the build piece 109 above the vertical column started out as a layer of powder deposited into the print bed, and then at a border prescribed by the design model the inclined layer was fused in those regions to become part of the build piece 109. Inclined slices were partially fused to include only the inclined portion, with the loose powder remaining where the gap 128 currently resides. It should be noted that while a PBF 3-D printer is used in this example, the principles of the present disclosure are not so limited and may be provided to a wide variety of 3-D printer types.

Figure 4:
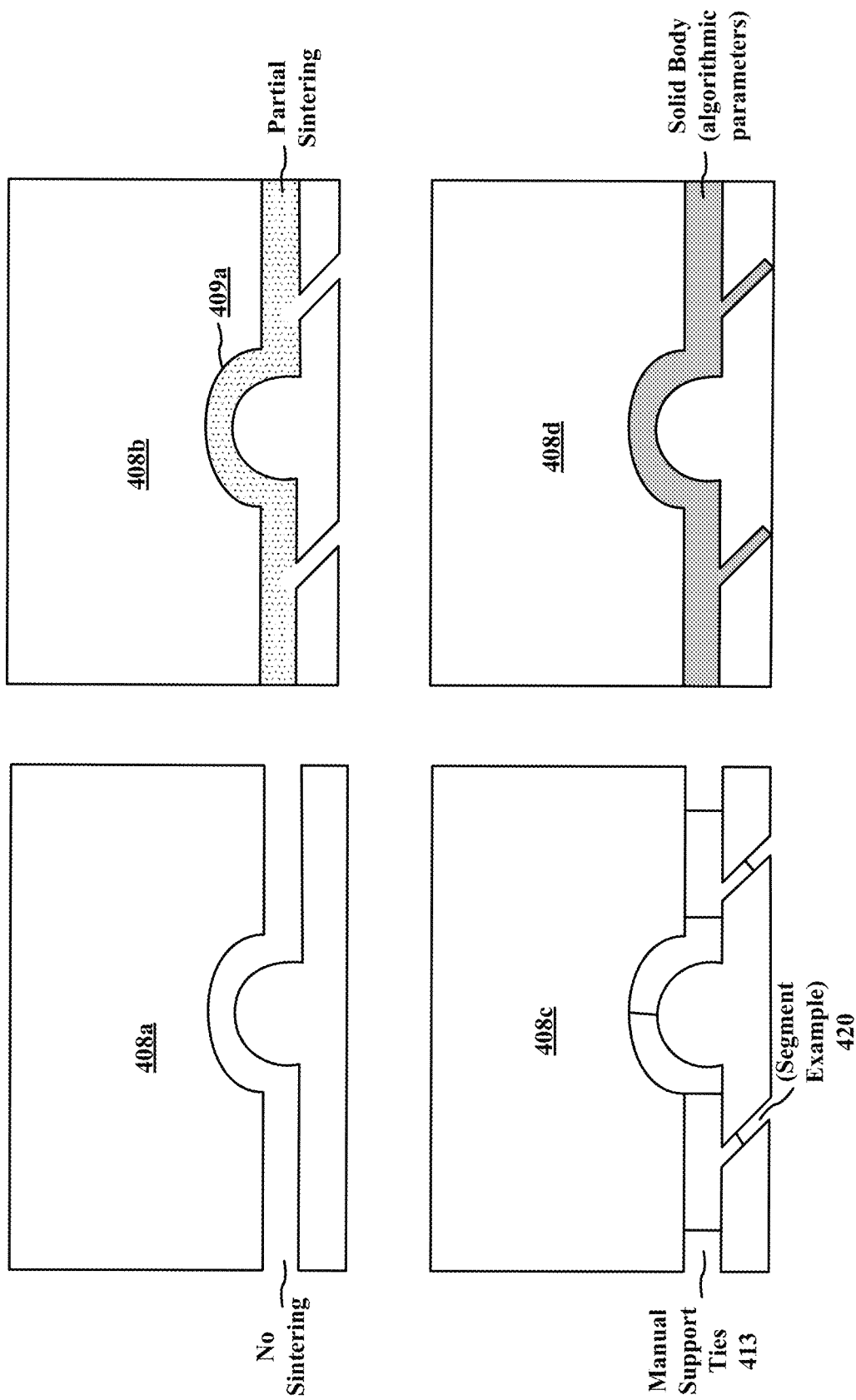
FIG. 4 illustrates a cross-sectional view of build pieces that use different types of supports in the respective gaps between the surrogate supports and the build pieces.

In certain alternative embodiments as illustrated in FIG. 4, the gap 128 between the surrogate support 161 and the build piece 109 may include material configurations other than or in addition to loose powder, such as a plurality of thin ties (413) that extend from the features of the build piece 109 to the surrogate supports. The objective of these alternative embodiments is twofold. First, the use of some minimal structure (the ties, partially sintered material, thin branches of solid material (413), etc.) enables greater precision support of particularly vulnerable features in the face of thermal expansion or other issues that may be present during the AM process, but without the disadvantages inherent in a wholesale fusing of the build piece 109 to the supports, as in many conventional embodiments. Second, the use of these partial material configurations makes it as easy as possible to separate the vulnerable features from the surrogate supports without damaging the build piece 109.

Nevertheless, in many or most cases, it may be determined that the loose powder in the gap 128 (often together with the lower support structure 133) is sufficient to support the vulnerable features of the build piece 109 and accordingly, the powder in the gap 128 need not be sintered or fused. Removal of the surrogate supports 161 in this latter case is a simple matter, as the loose powder is simply removed after the AM process is complete.

The loose powder that resides in gap 128 supports the vulnerable portions of the build piece 109. The loose powder is on top of, and shaped by, the corresponding surrogate support 161. The surrogates supports 161, in turn, are offset from the build piece 109 by the gap 128. The surrogates 161 may further be coupled to partially solid or rigid support structures 133 that may extend from the base of the build plate 107 to each surrogate support 161.

The gap 128 between the surrogate support 161 and the build piece 109 can be at a uniform or non-uniform distance across the geometry at a given surrogate support 161. That is to say, the gap 128 may be of uniform thickness or variable thickness. In an embodiment, the surrogate supports 161 with their corresponding gaps obviate the need for cutting conventionally fused supports from the build piece (a potentially dangerous undertaking to avoid damaging a fragile build piece) as is conventionally performed, and can be used to largely limit or eliminate the amount of post-processing work to remove the surrogate supports 161 from the build pieces 109. By eliminating these conventional post-processing steps, the surrogate supports 161 improve productivity and throughput of the build pieces 109. The cost of manufacturing the build pieces can therefore be reduced.

The use of these surrogate supports 161 can also eliminate surface roughness problems in complex build features attendant with the use of conventional supports. More specifically, the risk of cracking the build piece 109 or causing rough edges by splitting the supports from the build piece, as is done conventionally, is essentially eliminated. With but a few exceptions for thin strips of material and partially sintered material configurations corresponding to certain alternate embodiments, no removal of support material that otherwise contributes to the surface roughness problem of the build pieces is necessary. In these alternative embodiments where the gap includes material configurations such as partially sintered powder or manual support ties, minimal force is generally needed to remove the surrogate supports 161, which preserves the structural and positional integrity of the features to which the surrogate supports 161 are connected. Further, because they leave a gap filled only with powder which can be removed (or in other embodiments with easily removed structures), the surrogate supports 161 and associated gaps 128 also reduce the amount of working mass applied to these smaller and more complex features requiring support on the build piece 109. This is in contrast to conventional supports, which are often initially 3-D printed and attached to these complex features across their entire surfaces. The attachment and subsequent uncoupling of the conventional supports may inherently cause damage and unintended distortion (reshaping) of the smaller and hence more delicate features of the build piece. The surrogate supports 161 can therefore remove these compromises to quality and reduction of tolerance in the AM process itself and all the post-processing efforts. Also, the surrogate supports 161 proximal to the critical features of the build piece 109 can act as a heat sink for thermal management, which keeps the nominal shape of the features closer to their original design intent. Further distortion control can be achieved by using the energy supplied to melt the surrogates to balance the influx of energy into the system over time, so that no specific layer receives significantly more or significantly less energy than its predecessor layer. By providing surrogate supports 161 with greater flexibility to attach selectively to underlying support structures 133 to retain support where necessary, the use of such surrogate supports 161 overcome the stated deficiencies in the art.

Figure 1B:
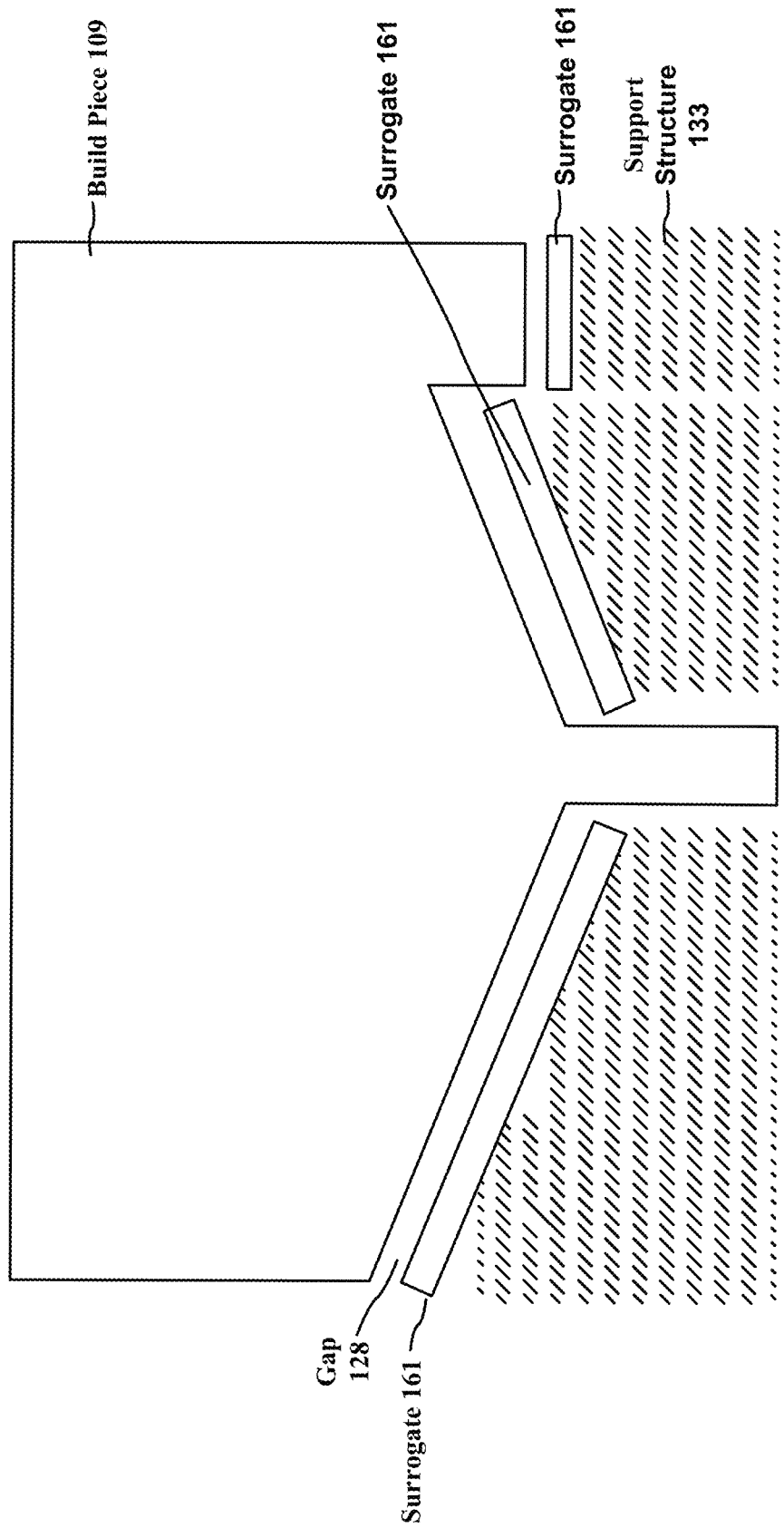
FIG. 1B is a conceptual diagram of a portion of a build piece of FIG. 1B showing the surrogate support structures.

FIG. 1B, below, shows a close-up of the combined build-piece/surrogate/support structure of FIG. 1A, but without the details of the printer. The loose powder in gap 128 is omitted in this view; however, as in FIG. 1A, the vulnerable regions of build piece 109 rest on the loose powder that fills gaps 128. The surrogate supports 161 as shown in FIGS. 1A-B represent typically solid, three-dimensional structures that are offset from the build piece 109 (or portion thereof), the latter representing the vulnerable surface to be supported. The gap 128 exists in the regions between the build piece 109 and the surrogate supports 161, and in an embodiment, includes loose powder to support the build piece 109 as described above, but without a permanent connection that can cause surface roughness and other damage upon post-processing separation. The gap 128 in the region between the build piece 109 and the surrogate support 161 can simply take advantage of the 3-D printer capabilities to include unmelted powder that was previously deposited by the printer in the course of depositing the various layers of powder. In an embodiment, the print instructions provided by a print controller 129 include information defining the one or more offsets in a 3-D print job that define the gap 128 and surrogate supports 161.

The build piece in FIG. 1A-B includes significant areas of overhang that are not being supported by the vertical column of the build piece 109 in the center, and thus would ordinarily require supports. Using the concept of a surrogate 161, the overhanging portions of the build piece are supported instead by the powder residing in the gap 128 defined by the surrogate, with the surrogate 161 extending across the overhanging portions. The surrogate 161, in turn, may be a fused area offset from the build piece 109 by the gap and supported by a further support structure 133, which may also be formed from layers of powder that had been deposited and melted in early layers. The support structure 133 need only include a matrix of material sufficient to support the build piece 109 and remaining surrogate pieces 161.

Because the gap 128 is typically filled with unfused powder between the build piece 109 and the support structures 161, post-processing steps are reduced. The vulnerable regions of the build piece are not connected to the support structures and need not be removed in a post-AM process.

The surrogate supports 161 may be perfectly contoured to reflect the corresponding feature(s) on the build piece 109. Alternatively, the surrogate supports 161 may be drastically different, depending on factors including the support needs. For example, the presence of intricate or complex geometrical features on a part may require the use of perfectly contoured surrogates to provide maximum support and accuracy. Conversely, simpler or larger features may be able to use more generalized and less precise surrogate features, which in the latter case may avail a faster, more efficient 3-D print rendering. In another example, the entire build piece 109 may be supported by a relatively flat surrogate underneath the overhanging sections of the part, thereby eliminating the build piece's connection to the build plate. This latter configuration may be achieved by using multiple tiers of surrogates, described further below.

Positioning of Critical Features.

Another significant advantage of the approach described herein is the flexibility accorded the designer in positioning the critical features. For example, if the left side of the build piece 109 in FIG. 1A included a significant number of sophisticated geometrical features, then to reduce the extensive and compromising use of prior art-based supports, the designer may be required to orient those features in an upward direction (i.e., to eliminate vulnerable regions at the expense of the creative design of the part). By contrast, using the concept of surrogate supports, the designer need not be so restricted and the detailed overhanging features can instead be directed downward as desired, along with a contoured surrogate to accommodate support of the features without significant (if any) post-processing. This flexibility in turn enables design space to be freed-up, as the upper portion of the build piece here can be used for additional or different purposes. Moreover, this flexibility means that the build piece can potentially be designed globally in a manner that minimizes the overall use of support structures.

Tiered Surrogates.

Figure 2:
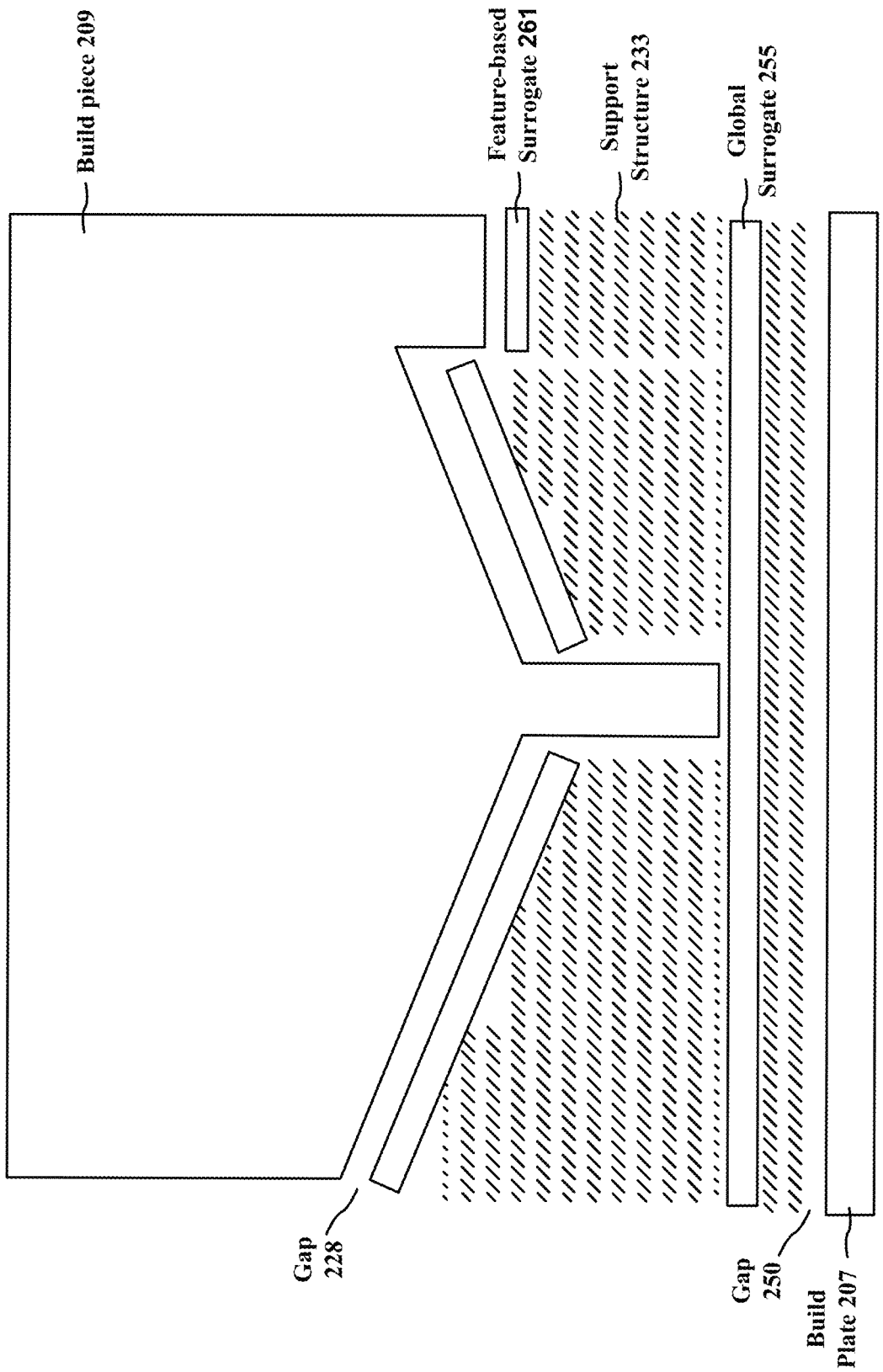
FIG. 2 depicts a cross-sectional view of a build piece and corresponding tiered surrogate supports.

FIG. 2 depicts a cross-sectional view of a build piece 209 and corresponding tiered surrogate supports. For clarity, the 3-D printer is omitted. As shown in FIG. 2, the feature-based surrogate supports 261 are similar to the surrogate supports 161 of FIG. 1A and, like in the earlier drawings, function to provide support without contact to the substantial overhanging portions of the build piece. A similar gap 228 may be populated with loose powder, e.g., formed during deposition cycles in the print. Also as in FIG. 1A, a solidified support structure 233 is provided below the feature-based surrogate supports 128, but is not part of the build piece 209. Unlike FIG. 1A or 1B, however, in which the bottom of the vertical column of the build piece 109 is attached directly to the build plate and therefore requires a post-processing step of removing the build piece 109 from the build plate 107, in FIG. 2 a global surrogate support 255 is printed or provided. Global surrogate support 255 may be composed of any suitable structure (such as a simple pattern to a solid rectangular structure) sufficient to sustain the weight and support of the elements above it. The purpose of the global surrogate structure 255 in this embodiment is to segregate the entire build piece 209 from the build plate 207. Additional solidified support structure 233 is present between the global surrogate support 255 and the feature-base surrogate supports 261 in order to further support the identified vulnerable areas on the build piece 209. Accordingly, "feature-based surrogate" refers to specific surrogate supports corresponding to specific vulnerable regions in the build piece 209.

Also, in an embodiment, another gap (not shown) of unfused powder may be present between the lower vertical column of the build piece 209 and the global surrogate 255, to effectively provide support to the support structure 233 and build piece 209 from the global surrogate 255 without specifically connecting the build piece 209 or support structure 233 to the global surrogate 255. In still another embodiment, a gap 250 of loose powder may separate the build plate 207 from the remaining structures. Thus, in the embodiment of FIG. 2, the build piece is already divorced from the build plate 207 via the global surrogate 255, and in some embodiments, powder-filled gap 250. Post-processing separation of the build piece 209 and build plate 207 in either embodiment is eliminated. After the AM process is complete, the build piece 209 need not be cut or otherwise post-processed. Rather, the build piece 209 can simply be removed off of the global surrogate. The remaining supporting structures can be cleared from the build plate 207. The process of FIG. 2 is exemplary in nature, and a number of other tiers may be possible depending on the nature of the build piece 209 and the objectives involved.

Another inherent advantage of the use of multiple tiers as shown in FIG. 2 is the ability to reuse the build plate in a subsequent build job. The build plate may require some simple machining or clean-up, e.g., to remove the global surrogate (i.e., where no gap 250 is present). However, because there are generally no parts directly connected to the build plate (as shown in the example of FIG. 2), the build plate preparation process will be easier and faster than if build piece removal were required, rendering multiple print jobs more straightforward.

Versatility and Variability of Surrogates.

Figure 3:
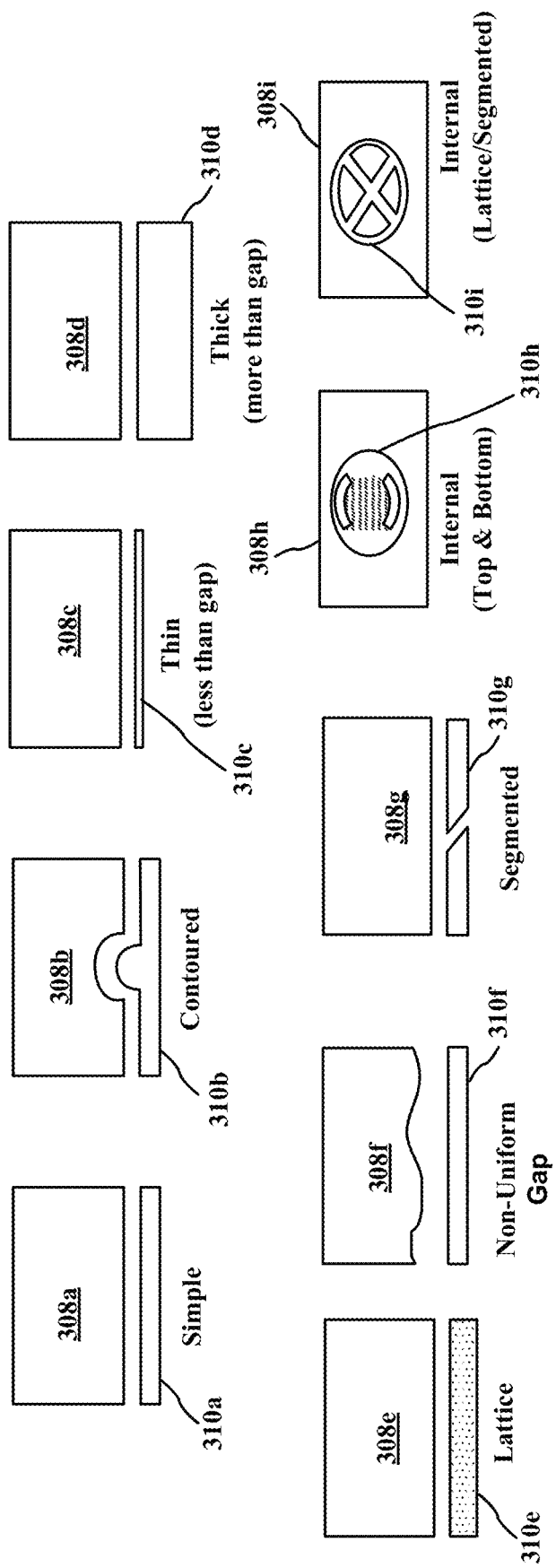
FIG. 3 illustrates a cross-sectional view of a set of build pieces and different configurations of the surrogate supports for each build piece.

In other embodiments, surrogate supports may be used for additional or alternative purposes, and may take on any number of geometries in order to accomplish different objectives. FIG. 3 illustrates a set of nine exemplary build pieces and different configurations of the surrogate supports for each build piece. The nine build pieces are represented by the reference numerals 308a-i. Likewise, for each build piece 308a-i, the corresponding surrogate support is labeled 310a-i.

As illustrated by the examples in FIG. 3, the surrogates can be thin or thick solid bodies, or can be composed of a more porous or lattice design, for example, to save powder costs. For exemplary thin profiles, build pieces 308a and 308c include, respectively, a simple surrogate support 310a that corresponds to build piece 308a, and a thin surrogate support 310c having a width less than that of the gap between the build piece 308c and the support 310c. It is noted that, for the purpose of most of these examples, the vulnerable regions of the build pieces are omitted for clarity and simplicity of illustration. By contrast, surrogate support 310d, coupled to build piece 308a, represents a thick piece for accommodating heavier parts, such that the support 310d is bigger than the gap. The surrogate may, in alternative embodiments such as surrogate 310b corresponding to build piece 308b, be contoured to a portion of a critical feature (i.e., the inverse curvature) or expand away from the critical feature itself to improve its removability. For example, in some embodiments such as build piece 308h and surrogate 310h, supports may be offset from the build piece on both the top and bottom surfaces using surrogates at both ends of the build piece via an orifice, thereby improving the ease of removal and eliminating an unintended load path.

The top and bottom surfaces of support 310h may be visible at a portion of the top of the build piece 308h and a portion of the bottom of the build piece 308h. Between the top and bottom may be unfused powder, or in other examples, a lightweight support structure used for handling the build piece 308h without placing undue pressure on other, more delicate regions of the build piece 308h. Referring to build piece 308i is a novel configuration where the surrogate support 310i is part of a lattice or segmented part internal to build piece 308i. Here again, where access (e.g., an aperture) is present, the internal structure 310i can be beneficial for moving the build piece 308i without disrupting other delicate portions of the part.

The surrogates 310 may also be decomposed into disjointed segments that are all connected to one another and may also be used as the supports themselves, such as in build piece 308g and corresponding segmented surrogate support 310g. Tabs, grooves or any other variations may be added to further improve the removability. This strategy can be applied to PBF, vat polymerization, material extrusion and any other AM technology. They can also be leveraged for all materials, including multi-material solutions. In build piece 308e, a lattice surrogate support 310e has been constructed to provide the part with the necessary support while saving powder by using a lattice structure and reducing mass.

In the examples of FIG. 3 above, the gaps are assumed to include unfused powder; in other embodiments, however, structure may be strategically placed in the gap area to provide for increases in support where needed without using wholesale supports covering and fusing the entire surface of the feature with a hard material, as is conventionally done. In PBF and certain other AM processes, for example, as noted above with reference to FIG. 1A, a gap may be provided between the surrogate supports and the features. As noted above in various embodiments, the gap may include powder that is partially sintered or fully sintered at localized offsets to provide the requisite support and conductive path for thermal management during printing. The objective of providing partial sintering or full sintering at localized offsets is to identify the optimal settings to maintain build quality while allowing for efficient surrogate removal. For example, to ensure that the gap provides the requisite support for the critical features at specific times (including, for instance, when the initial portion of an overhanging feature is first fused), the gap may be configured to include partially sintered powder or fully sintered thin segments that are sufficient to retain support for the features during all stages of the 3-D print, but that make it easy to separate the features with very small forces after the print. Additional support may be desirable in cases where the features are sophisticated or very small. In an embodiment, the surface area of the features that include contacts (present in the gap) is comparatively small, thereby minimizing the negative effect on the build pieces during support removal.

Partial sintering embodiments may be effected through uniform exposure to the energy beam that may be lower than that used for printing the actual part and/or the surrogate. This partial sintering may be printed by targeting local regions within the gap, as opposed to globally across it.

FIG. 4 illustrates a cross-sectional view of build pieces that use different types of supports in the gap between the surrogate support and the build pieces 408a-d. In many embodiments, such as where the features are not geometrically sophisticated or where the overhang is minimal, the gap may include unfused power (no sintering). In other embodiments, such as to accommodate more sophisticated features and/or for thermal management or the prevention of sliding, partial sintering, manual support ties such as segments, or some level of solid structure (e.g., structures based on algorithmic parameters) may be used. Advantageously, any build piece can use surrogates offset by a spectrum of optimal features in the gap, from unfused powder on one end to solid material on the other end. In whatever case, it is generally desirable to maintain a balance of objectives that, while addressing thermal or other parameters and providing additional support for critical features, the amount and impact of AM post-processing steps are minimized, as discussed above.

In the example of build piece 408a, no sintering occurs and the gap between the build piece 408a may include loose or unfused powder. Build piece 408b depicts segmented surrogate supports, with one such support used to support the curved feature 409a, and the remaining supports in line with the middle support. Instead of unfused powder, the powder in the gap has been partially sintered to create a strong load path and to manage the conduction of heat during 3-D printing, but to maintain a relative weak separation at post-processing. The disjointed nature of the supports and the partial nature of the sintering may make support removal easier, and may represent a design balance between adequately supporting delicate features while facilitating the ease of the removal process.

Referring still to FIG. 4, build piece 408c is coupled to its requisite surrogate support by using manual support ties 413. In an embodiment, the support ties are manually inserted between the gap. The surrogate support itself also may include segments 420, which may be sintered powder. Both the support ties and segments are ideally strong enough to support the build piece 408c but easy to remove during the support removal process. Like the partially sintered powder, the support ties and segments represent a balance between providing support via the gap and facilitating heat transfer and support removal.

Build piece 408d has been designed to include a solid body in the gap. The solid body may be constructed from the print material or from a different (e.g., softer) print material. The solid body construction in the gap likely balances the support requirement and thermal conduction factors over the importance of post-processing support removal. However, the algorithmic parameters may be selected such that the solid body of material is dramatically different in composition than the fused powder, and consequently easy to remove from the build piece without risk of the attendant cracks and other problems that may result. In the case of build piece 408d, the disjointed gaps are advantageously connected via the solid material, and given the right algorithmic parameters that appropriately balance support with ease of removal, the surrogates may include solid material in the gap that is soft enough to be quickly and easily removed from the build piece 408d.

The four techniques shown in FIG. 4 have their benefits depending on the application. Partial sintering can be achieved using explicit modeling of features or more subtle methods. In some embodiments, the partial sintering regions (i.e., the gaps) can be modeled as solids between the surrogate and the part. By modeling the gaps as solids, manual placement of support parameters between the surrogate and the part is no longer required. The modeled gaps may have unique parameters that may, for example, behave as supports with respect to layer height, spacing, power, speed, offsets, focus, etc. This type of modeling may advantageously reduce the time spent in CAM operations prior to releasing parts for print and may allow for faster iteration and parametric studies.

In an embodiment, surrogate supports can be added to a model prior to thermal compensation, thereby receiving the compensation themselves. In order to achieve this goal with displacement continuity, i.e. the gap between the surrogate and build piece remaining constant, the gap can be modeled as a solid body with contact but no overlap interference, such that the gap between the part and the surrogate is preserved after compensation. Surrogates can also be modeled after thermal compensation to provide a more accurate but undistorted geometry.

Figure 5:
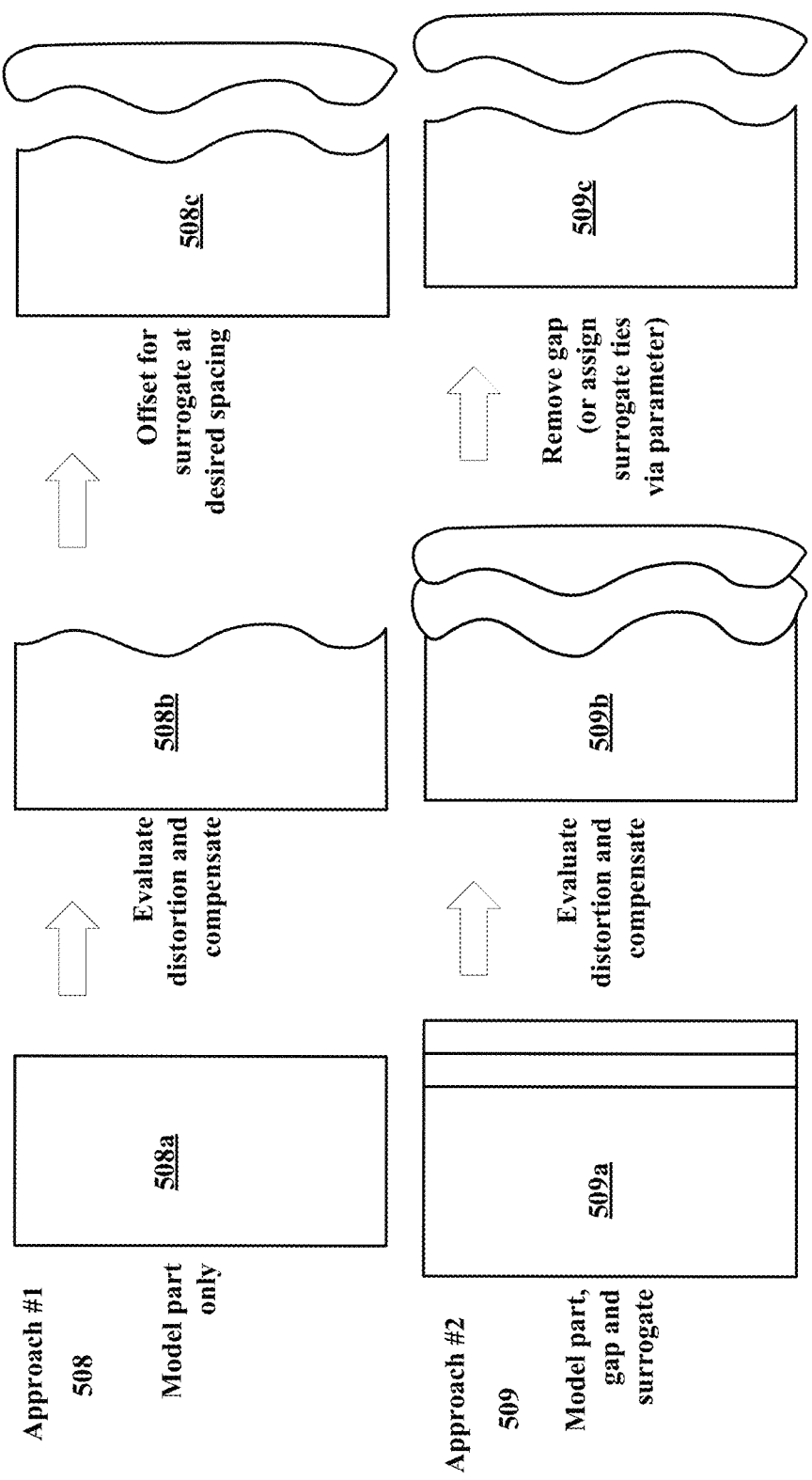
FIG. 5 depicts a partial flow diagram demonstrating two exemplary surrogate modeling embodiments prior to printing the build piece to address minimizing distortion.

FIG. 5 depicts a partial flow diagram demonstrating various surrogate modeling embodiments prior to printing the build piece to address distortion. Distortion analysis is often conducted using lightweight CAD representations. It is therefore challenging and time-consuming to add a feature to the model after it has been converted to its lightweight representation. That being said, a surrogate can still be modeled at a prescribed offset after the distortion analysis and compensation are completed. Another approach is to model the surrogates along with the build piece prior to the analysis. The current challenge with the majority of distortion analysis software, however, is that multiple solid bodies (in the case of this disclosure, the build piece and the novel surrogates as presented herein) would be treated as separate entities. In some cases, the distortion analysis may have them distort in relatively similar manners but in other cases, they may distort very differently from one another. As such, there is no guarantee that the gap between the build piece and surrogates will be maintained at the desired distance.

Accordingly, this disclosure includes a method for circumventing that challenge by modeling an additional body for the gap and running that body through the distortion analysis as well. The build piece is nominally in contact with the gap which is nominally in contact with the surrogate. This contact relationship will inherently be preserved due to the continuity of solid material (primarily due to the voxelization in the distortion analysis). Once the distortion analysis is complete and compensation is applied, the model of the gap may be removed, ultimately preserving the original distance between the build piece and the surrogates.

In a first approach 508, initially only build piece 508a is modeled. The model can be used to evaluate, via one or more algorithmic simulations, the amount of anticipated distortion or similar force-inducing damage to which the vulnerable features requiring support (see portion 508b) may be subject. Compensation for the distortion can then be calculated by identifying a desired surrogate spacing and offsetting the surrogate accordingly, as shown in configuration 508c.

In a second approach 509, the part, gap and surrogate may be initially modelled. Using the combined model 509a, the amount of expected distortion to the vulnerable features may be evaluated (509b). Depending on the results of the evaluation, the material in the gap may be removed (509c) if necessary to preserve the integrity of the features. Alternatively, surrogate ties, such as small structural threads extending across the gap, may be assigned based on the identified parameters. The surrogate ties may provide support for the features, e.g., during the AM phase. After AM is complete, the ties can be easily removed without distorting the features to which the ties are coupled.

Figure 6:
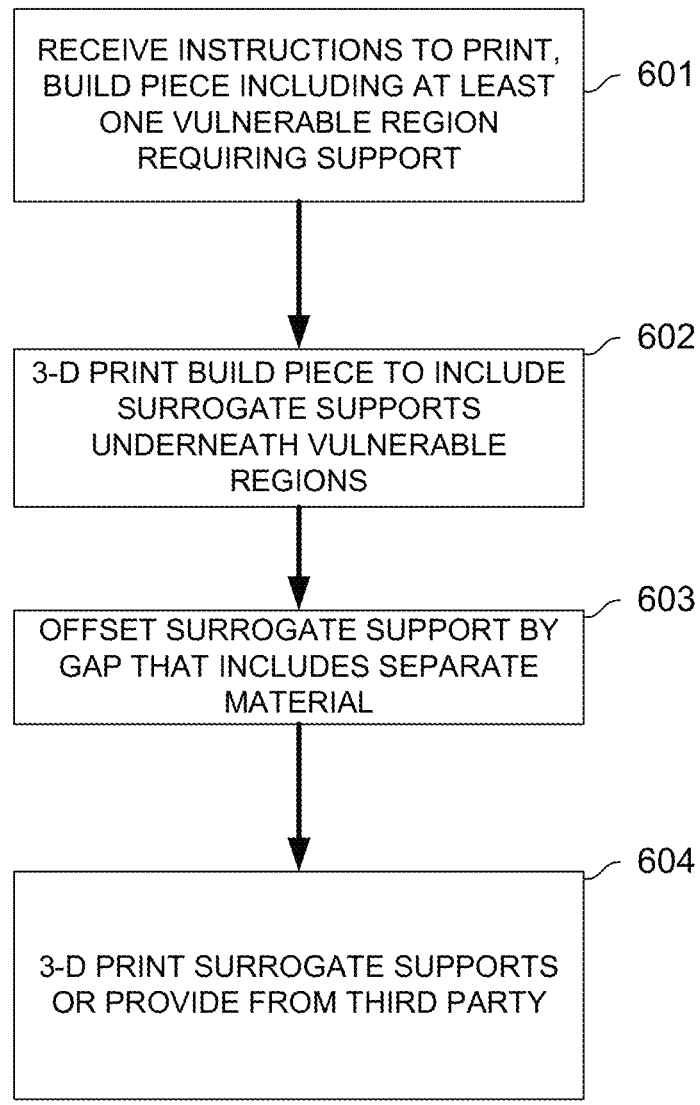
FIG. 6 illustrates an exemplary flow diagram of a 3-D printer printing a build piece and one or more surrogate supports.

FIG. 6 illustrates an exemplary flow diagram of a 3-D printer printing a build piece and one or more surrogate supports. In step 601, the 3-D printer receives instructions to print a build piece that includes at least one vulnerable region requiring support. In step 602, the build piece is 3-D printed to include surrogate supports. In an embodiment, the surrogate supports are co-printed with the build piece (step 604). The surrogate support is also offset from the build piece by a gap that includes separate material (step 603). Separate material does not necessarily mean that the material be separate from the printed material at an atomic level, but just that its properties are different in this embodiment because algorithmic parameters are used to idealize the material's characteristics as discussed in the embodiment of FIG. 4, build piece 408D. Separate material in this context can also mean the material(s) used in the 3-D printer at issue, but being partially sintered, for example, or being threaded contacts as described above.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

The invention claimed is:

1. A build job, comprising:
   one or more vulnerable regions requiring support during a three-dimensional (3-D) print; and
   at least one surrogate support offset from the vulnerable regions by a gap, wherein the surrogate support comprises at least one feature-based surrogate support in a first material configuration, the at least one feature-based surrogate support configured to support a vulnerable region in the one or more vulnerable regions, wherein the gap comprises a second material configuration.

2. The build job of claim 1, wherein the first material configuration comprises fused powder.

3. The build job of claim 1, wherein the second material configuration comprises partially sintered powder.

4. The build job of claim 1, wherein the at least one feature-based surrogate support further comprises a support structure extending underneath the feature-based surrogate support to a fixed base.

5. The build job of claim 4, wherein the fixed base comprises one of a build plate, or a global surrogate support configured to separate the at least one feature-based surrogate support from the build plate.

6. The build job of claim 4, wherein the support structure comprises a lattice.

7. The build job of claim 1, wherein the surrogate support is segmented into a plurality of supports.

* * * * *